(12) United States Patent
Muranaka (10) Patent No.: US 11,435,715 B2
(45) Date of Patent: Sep. 6, 2022

(54) SYSTEM AND METHOD FOR DETECTING CHANGE OVER IN MANUFACTURING FIELD

(71) Applicant: Hitachi, Ltd., Tokyo (JP)

(72) Inventor: Nobuyuki Muranaka, San Jose, CA (US)

(73) Assignee: HITACHI, LTD., Tokyo (JP)

(*) Notice: Subject to any disclaimer, the term of this patent is extended or adjusted under 35 U.S.C. 154(b) by 70 days.

(21) Appl. No.: 16/874,365

(22) Filed: May 14, 2020

(65) Prior Publication Data

US 2021/0356928 A1 Nov. 18, 2021

(51) Int. Cl.
G05B 19/05 (2006.01)

(52) U.S. Cl.
CPC .... *G05B 19/05* (2013.01); *G05B 2219/15038* (2013.01)

(58) Field of Classification Search
USPC .......................................................... 700/79
See application file for complete search history.

(56) References Cited

U.S. PATENT DOCUMENTS

| | | | |
|---|---|---|---|
| 4,718,025 A * | 1/1988 | Minor ................... | G01F 15/063 345/440 |
| 6,556,950 B1 | 4/2003 | Schwenke et al. | |
| 9,112,779 B2 * | 8/2015 | Yamada .............. | H04L 43/0817 |
| 10,360,196 B2 * | 7/2019 | Hsiao ...................... | G06F 16/22 |
| 2004/0243256 A1 * | 12/2004 | Willis ................ | G05B 19/4183 700/21 |
| 2010/0082119 A1 | 4/2010 | Case et al. | |
| 2013/0144407 A1 * | 6/2013 | Nausley ............. | G05B 23/0264 700/79 |
| 2016/0274552 A1 * | 9/2016 | Strohmenger ......... | G06Q 10/06 |
| 2019/0278247 A1 * | 9/2019 | Abe ..................... | G05B 23/0235 |
| 2020/0133244 A1 * | 4/2020 | Kamiguchi ........ | G05B 23/0272 |
| 2020/0333759 A1 * | 10/2020 | Kim ..................... | G06F 12/0238 |
| 2020/0336390 A1 * | 10/2020 | Hsiao ...................... | H04L 41/22 |
| 2021/0356928 A1 | 11/2021 | Muranaka | |

FOREIGN PATENT DOCUMENTS

| | | |
|---|---|---|
| JP | 2018012164 A | 1/2018 |
| JP | 2018097486 A | 6/2018 |

OTHER PUBLICATIONS

Japan Patent Office. Notice of Reasons for Refusal dated Mar. 24, 2022. JP Patent Application No. 2021-078962. English Translation. 3 pages.
Japan Patent Office. Notice of Reasons for Refusal dated Mar. 24, 2022. JP Patent Application No. 2021-078962. Japanese Language. 2 pages.

* cited by examiner

*Primary Examiner* — Md Azad
(74) *Attorney, Agent, or Firm* — Procopio, Cory, Hargreaves & Savitch LLP (57) ABSTRACT

Example implementations described herein are directed to a change over detection system and method. Such example implementations facilitate updating the information of the production line in an Internet of Things (IoT) system to the latest version. Through the example implementations described herein, device rearrangement in manufacturing field can thereby be detected.

11 Claims, 13 Drawing Sheets

| Date | Src | Metrics No | Value | |
|---|---|---|---|---|
| 2019-11-05 10:36:01 | PLC#1 | #1 | 0.765 | 411 |
| 2019-11-05 10:36:01 | PLC#1 | #2 | 0.752 | 412 |
| 2019-11-05 10:36:01 | PLC#1 | #3 | 0.729 | 413 |
| ••• | | | | |
| 2019-11-05 10:36:38 | PLC#2 | #1 | 0.28 | 414 |
| 2019-11-05 10:36:38 | PLC#2 | #2 | 12097 | 415 |
| ••• | | | | |

Columns: 401 (Date), 402 (Src), 403 (Metrics No), 404 (Value)

Data Storage 162

FIG. 4

| Date | New status | PLC ID | Source | |
|---|---|---|---|---|
| 501 | 502 | 503 | 504 | |
| 2019-11-05 10:37:01 | Stop | PLC #3 | Sensor (Power) | 511 |
| 2019-11-05 10:37:10 | Stop | PLC #1 | MES | 512 |
| 2019-11-05 10:37:13 | Stop | PLC #2 | Andon | 513 |
| ••• | | | | |
| 2019-11-05 10:41:23 | Running | PLC #1 | MES | 514 |
| 2019-11-05 10:41:31 | Running | PLC #2 | Andon | 515 |
| 2019-11-05 10:41:45 | Running | PLC #3 | Sensor (Power) | 516 |
| ••• | | | | |

Recent PLC running information — 182

| Date | Src | Dst | Operation Signal | |
|---|---|---|---|---|
| 2019-11-05 9:36:01 | MES | PLC#3 | 038sadbalea3sdafge | |
| 2019-11-05 10:35:13 | MES | PLC#1 | 01klsdfinkasjnd | 711 |
| 2019-11-05 10:35:52 | MES | PLC#2 | Qa1pwtpwqthsn | 712 |
| 2019-11-05 10:36:16 | MES | PLC#3 | 80tyjwkinthenvffi30 | 713 |
| 2019-11-05 11:13:38 | MES | PLC#2 | 879in32lzsfv1gang | 714 |
| ••• | | | | 715 |

701 / 702 / 703 / 704

Recent operation signals — 184

Assuming change over occurred at 10:41:45; pick up the following

| Date | Src | Dst | Operation Signal |
|---|---|---|---|
| 2019-11-05 9:36:01 | MES | PLC#3 | 038sadbalea3sdafge |
| 2019-11-05 10:35:13 | MES | PLC#1 | 01klsdfinkasjnd |
| 2019-11-05 10:35:52 | MES | PLC#2 | Qa1pwtpwqthsn |
| 2019-11-05 10:36:16 | MES | PLC#3 | 80tyjwkinthenvff30 |
| 2019-11-05 11:13:38 | MES | PLC#2 | 879in32lzsfv1gang |
| ... | | | |

SYSTEM AND METHOD FOR DETECTING CHANGE OVER IN MANUFACTURING FIELD

BACKGROUND

Field

The present disclosure is generally related to manufacturing systems, and more specifically, for systems and methods to detect change over in a manufacturing field

Related Art

With applying an IoT (Internet of Thing) solution to the manufacturing field, an IT (information technology) server collects the data that represents the behavior of manufacturing machines on the field via PLC (Programmable Logic Controller). Many productive lines that involve multiple PLCs produce many kinds of product types in a mixed production manner. Product types can change frequently according to the production plan. When the product type is changed, the PLC obtains different settings from the MES (Manufacturing Execution System), manual operation, and so on, and the metrics corresponding to the data retrieved from the PLC may also become different. Such events are known as a change-over. Further, the management of the manufacturing field and IT server are siloed from each other, so engineers of the IT server cannot obtain the change-over notification. Thus, there is a need to detect the change-over event from the IT server side.

SUMMARY

Aspects of the present disclosure can include a method, which can involve, for a detection of a stoppage and a restart of the PLC within a threshold period of time, retrieving first metrics from the PLC from before the stoppage and second metrics from the PLC from after the restart; extracting first features from the first metrics and second features from the second metrics; and for a difference between the first features and the second features exceeding a threshold, transmitting a notification to an asset management server indicative of a changeover of an asset of the PLC.

Aspects of the present disclosure can include a non-transitory computer readable medium, storing instructions which can involve, for a detection of a stoppage and a restart of the PLC within a threshold period of time, retrieving first metrics from the PLC from before the stoppage and second metrics from the PLC from after the restart; extracting first features from the first metrics and second features from the second metrics; and for a difference between the first features and the second features exceeding a threshold, transmitting a notification to an asset management server indicative of a changeover of an asset of the PLC.

Aspects of the present disclosure can include a system which can involve, for a detection of a stoppage and a restart of the PLC within a threshold period of time, means for retrieving first metrics from the PLC from before the stoppage and second metrics from the PLC from after the restart; means for extracting first features from the first metrics and second features from the second metrics; and for a difference between the first features and the second features exceeding a threshold, means for transmitting a notification to an asset management server indicative of a changeover of an asset of the PLC.

Aspects of the present disclosure can include an apparatus which can involve, a processor configured to, for a detection of a stoppage and a restart of the PLC within a threshold period of time, retrieve first metrics from the PLC from before the stoppage and second metrics from the PLC from after the restart; extract first features from the first metrics and second features from the second metrics; and for a difference between the first features and the second features exceeding a threshold, transmit a notification to an asset management server indicative of a changeover of an asset of the PLC.

BRIEF DESCRIPTION OF DRAWINGS

FIG. 6($a$) illustrates a flowchart on an example of the behavior base change over detector in accordance with an example implementation.

FIG. 6($b$) illustrates an example of feature extraction in accordance with an example implementation.

FIG. 8($a$) illustrates a flowchart of an example of the learning change over, in accordance with an example implementation.

FIG. 8($b$) illustrates an example of extraction of data from the flow of FIG. 8($a$).

DETAILED DESCRIPTION

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations described herein are directed to a change over detection method and system.

Figure 1:
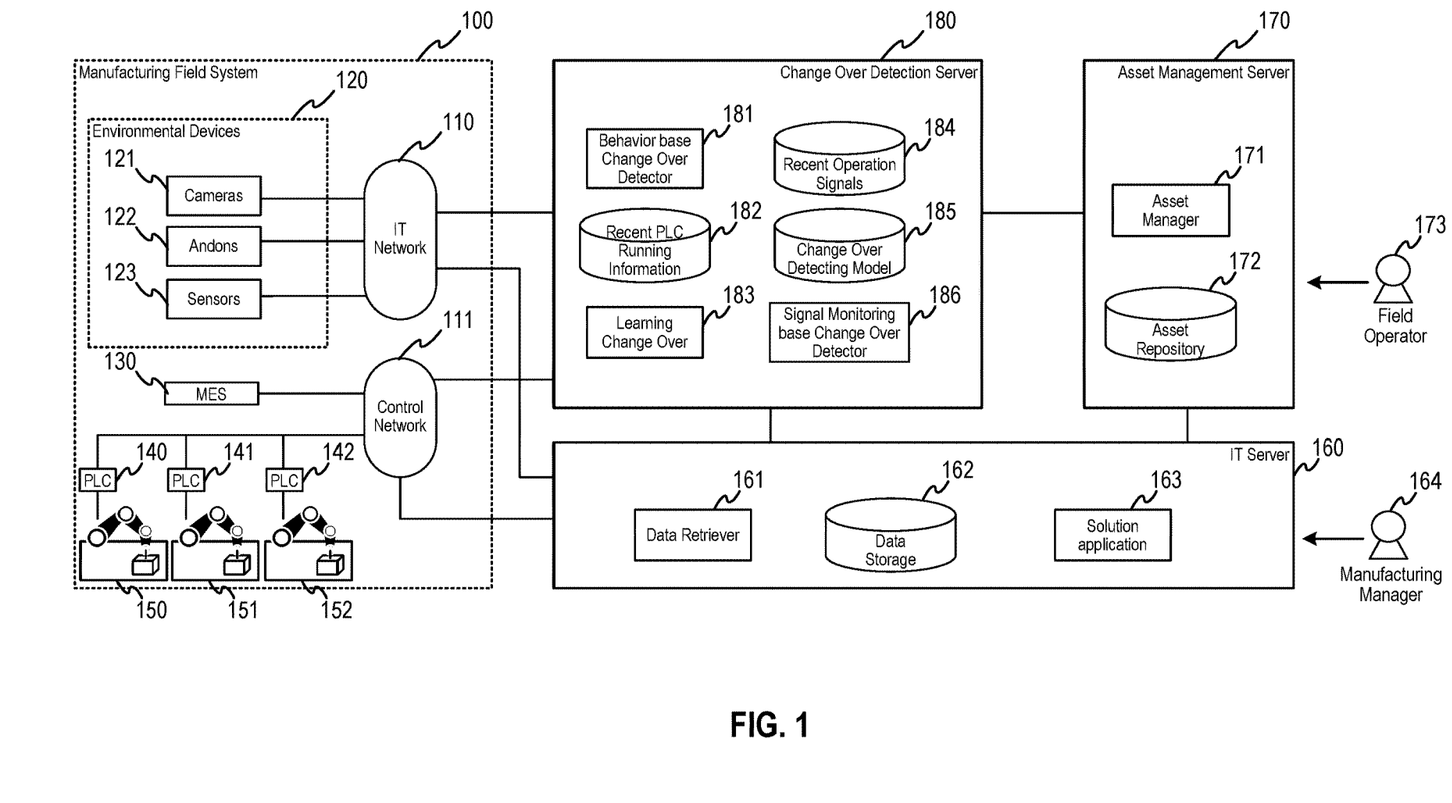
FIG. 1 illustrates a system diagram of an example change over detection system in accordance with an example implementation.

FIG. 1 illustrates a system diagram of an example change over detection system in accordance with an example implementation. The example system involves at least one Manufacturing Field System 100, Asset Management Server 170, IT Server 160 and Change Over Detection Server 180.

The Manufacturing Field System 100 involves an IT Network 110, Control Network 111, one or more environmental devices 120, a MES 130, one or more PLCs 140, 141, 142, and one or more Assets 150, 151, 152. The IT Network 110 facilitates connections between one or more environmental devices 120, Change Over Detection Server 180, and IT Server 160. The Control Network 111 facilitates connections between MES 130, one or more PLCs 140, 141, 142, one or more Assets 150, 151, 152, Change Over Detection Server 180, and IT Server 160. Environmental devices 120 can involve various devices such as one or more Cameras 121, Andons 122 and Sensors 123.

The IT Server 160 involves one or more data retrievers 161, data storage 162 and one or more solution applications 163. The IT server 160 is connected to the control network 111. The data retriever 161 acquires data from MES 130 and PLCs 140-142, annotates metadata onto the acquired data, and stores the annotated data into data storage 162. For example, if the acquired data is "0.71, 0.69" and it is acquired from PLC-A, the data retriever 161 creates annotated data such as "PLC-A, screw #1 torque, 0.71, screw #2 torque, 0.69". The solution application 163 reads the annotated data from the data storage 162, conducts analytics and provides the analytics results to the manufacturing manager 164.

The asset management server 170 involves an asset manager 171 and asset repository 172. The asset manager 171 provides a configuration of the data retriever 161 based on the asset repository 172. The configuration indicates how to annotate metadata onto the acquired data.

The change over detection server 180 involves a behavior base change over detector 181, recent PLC running information 182, a learning change over 183, a recent operation signals 184, a change over detecting model 185 and a signal monitoring base change over detector 186.

Figure 2:
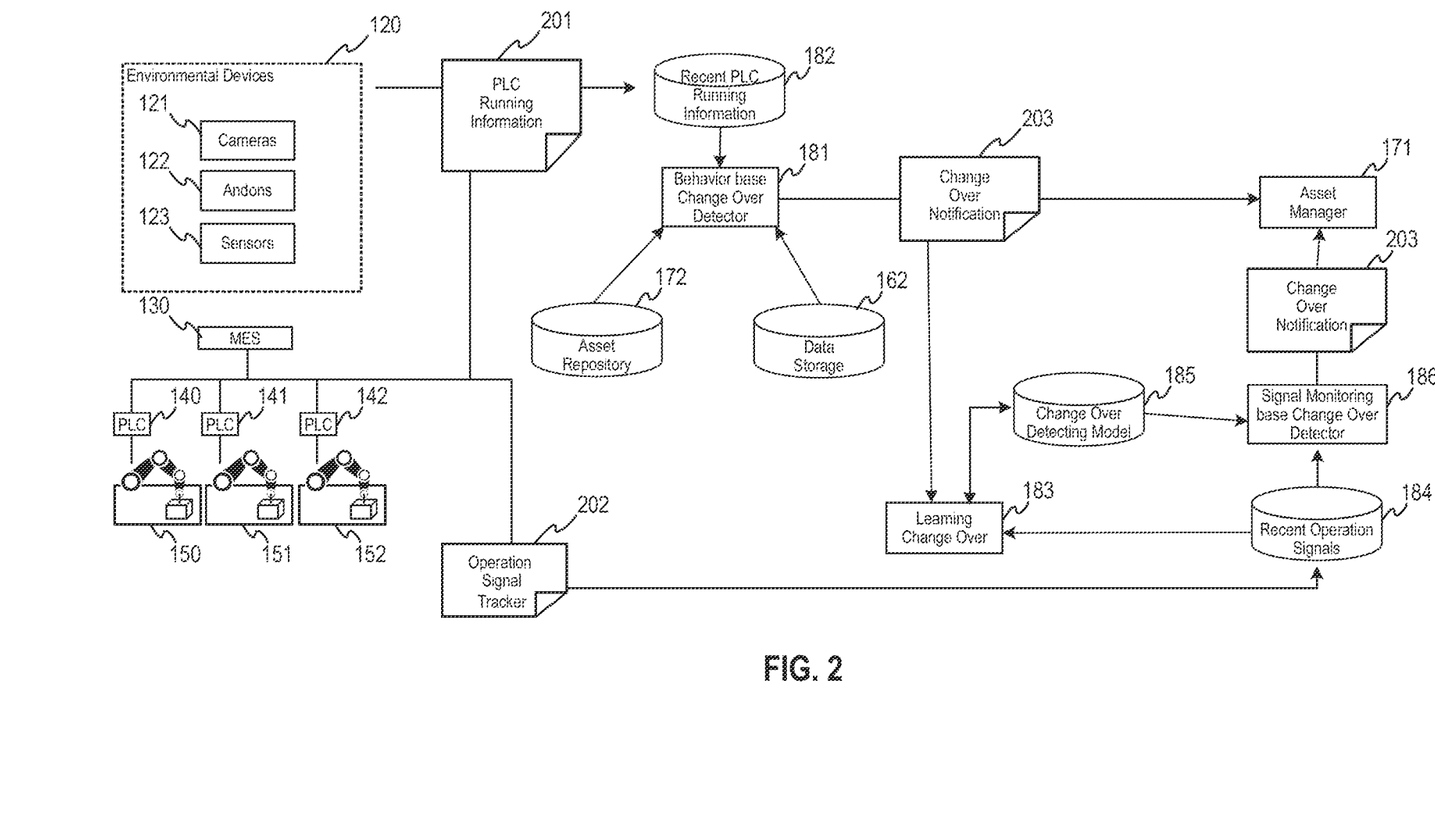
FIG. 2 illustrates a data flow in the change over detection server, in accordance with an example implementation.

FIG. 2 illustrates a data flow in the change over detection server 180, in accordance with an example implementation. In an example implementation, at 201 the change over detection server 180 acquires recent PLC running information 182 from environmental devices 120 and MES 130. Simultaneously, at 202 the operation signal tracker monitors one or more operation signals and stores the monitored result to the recent operation signals 184.

Then, the behavior base change over detector 181 evaluates if a change over has occurred by using PLC running information 201, asset repository 172 and data storage 162. The behavior base change over detector 181 sends a change over notification 203 to the asset manager 171 and learning change over 183 if a change over has occurred. Then the learning change over 183 executes a learning process through using the change over notification 203 and recent operation signals 184, and reflects the result to change over detecting model 185.

The signal monitoring base change over detector 186 evaluates if a change over has occurred by using the recent operation signals 184 and the change over detecting model 185. If a change over has occurred, the signal monitoring base change over detector 186 sends the change over notification 203 to the asset manager 171.

Figure 3:
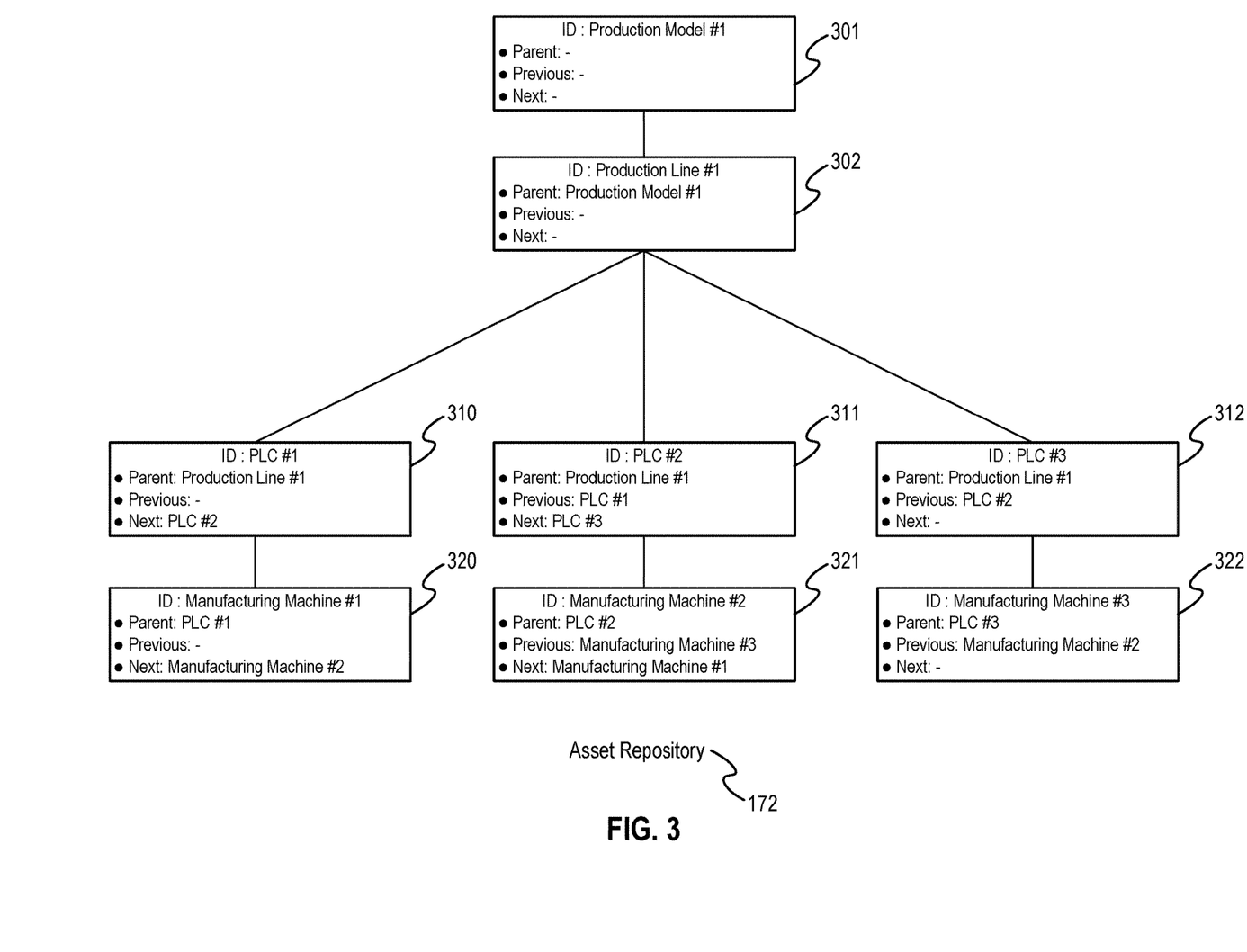
FIG. 3 illustrates an example of the asset repository in accordance with an example implementation.

FIG. 3 illustrates an example of the asset repository 172 in accordance with an example implementation. The production model #1 shown in 301 and 302 relates PLC #1, #2, and #3 as shown in 310, 311, and 312 with corresponding manufacturing machines 320, 321, and 322.

Figure 4:
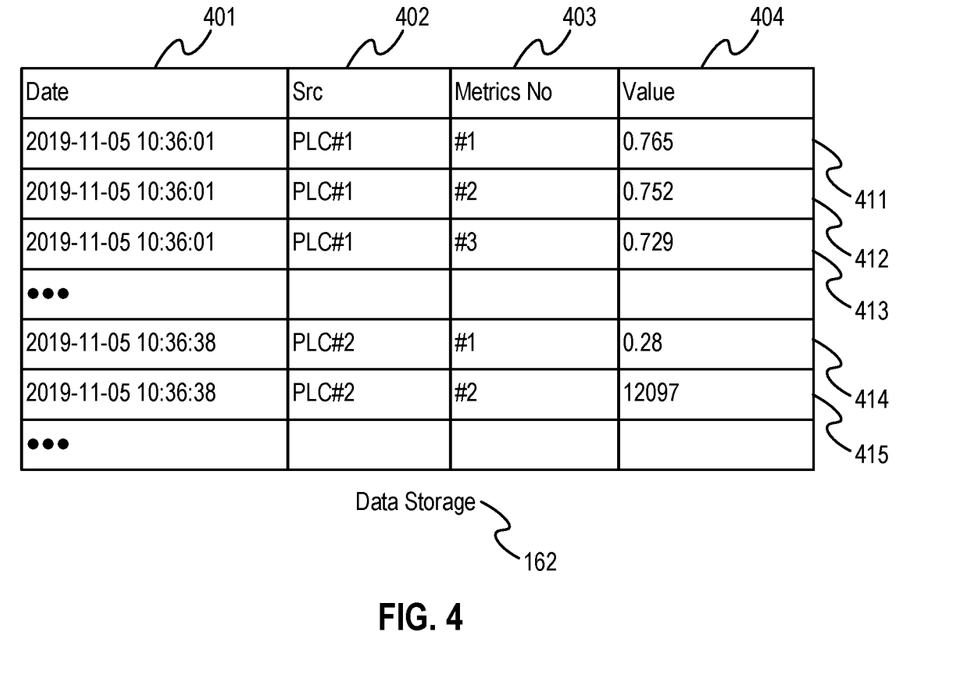
FIG. 4 illustrates an example of the data storage in accordance with an example implementation.

FIG. 4 illustrates an example of the data storage 162 in accordance with an example implementation. The data storage 162 stores the data the data retriever 161 retrieved from MES 130 and one or more PLCs 140, 141, 142 in a time series manner. Such data can include the date of the data 401, source PLC 402, metrics number 403, and the value recorded from the PLC 404.

Data storage 162 can manage one or more entries 411, 412, 413, 414, 415. For example, entry 411 indicates that at a date of "2019-11-05 10:36:01", from source PLC#1, the value of a metric #1 is 0.765.

Figure 5:
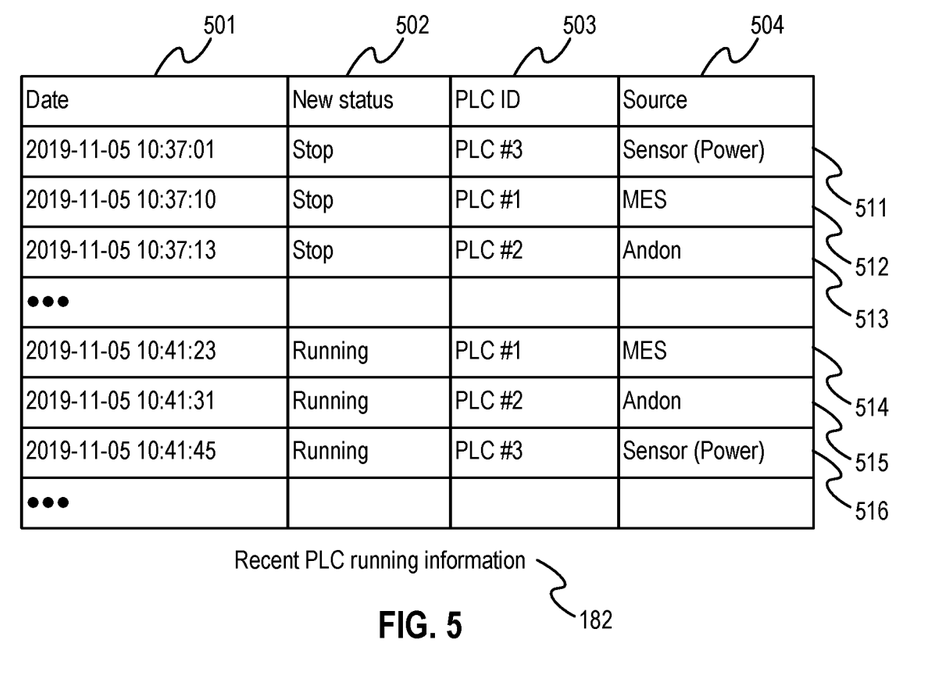
FIG. 5 illustrates an example of the recent PLC running information in accordance with an example implementation.

FIG. 5 illustrates an example of the recent PLC running information in accordance with an example implementation. The recent PLC running information 182 stores the information collected from environmental devices 120 and MES 130 in a time series manner for a certain duration (e.g. 1 day). Such information can include the date of the information 501, the newest status of the PLC 502, the PLC ID 503, and the source of the information 504.

Recent PLC running information 182 can manage one or more entries 511, 512, 513, 514, 515, 516. For example, entry 511 indicates that on date "2019-11-05 10:37:01", PLC having the ID of PLC#3 changed status to stop after the source (Power sensor) indicated that PLC#3 has stopped. Through the PLC running information, the stop and restart of various PLCs can thereby be known as well as the time that the PLCs stopped and restarted.

Figure 6A:
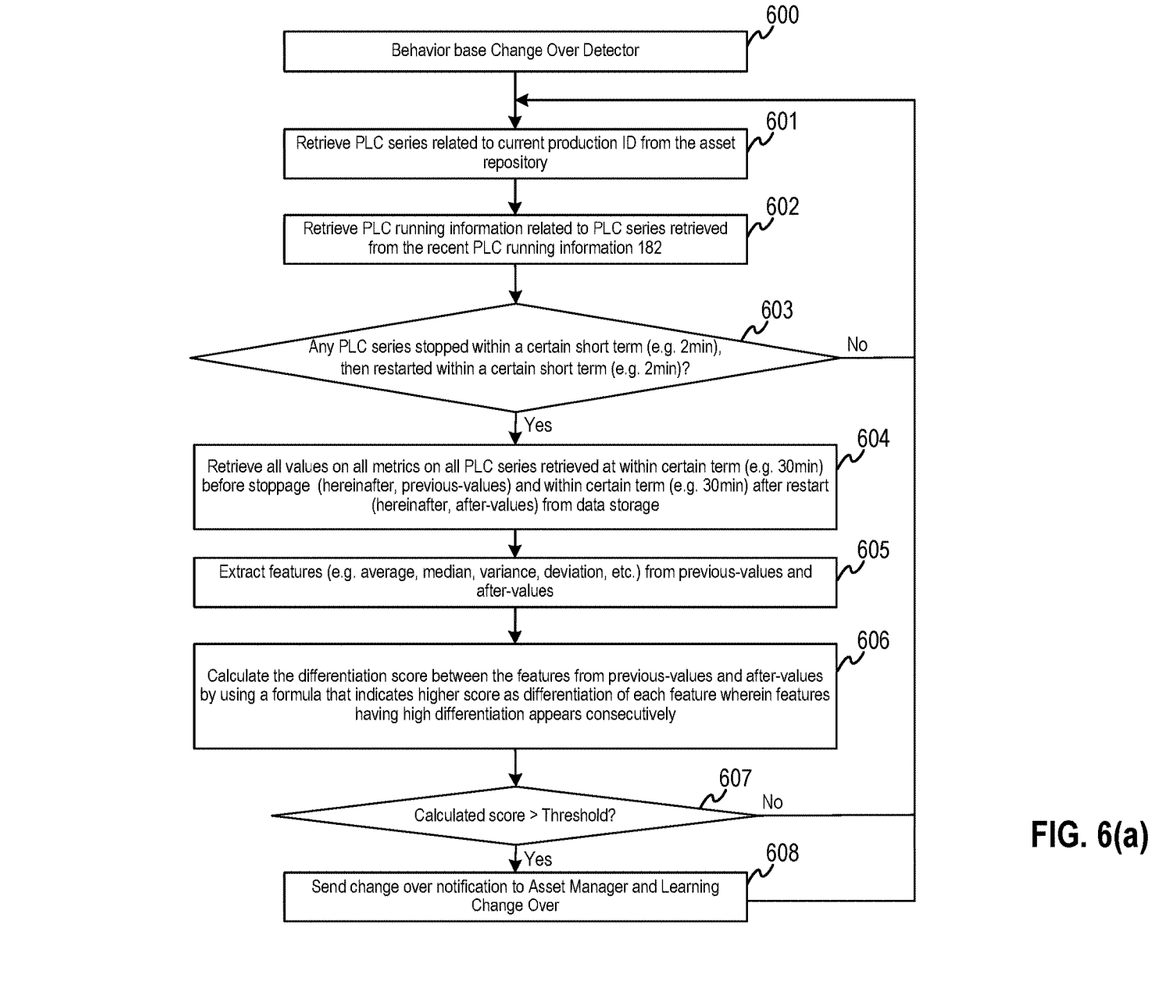

FIG. 6(a) illustrates a flowchart on an example of the behavior base change over detector 181 in accordance with an example implementation. The change over detector 181 generates and sends the change over notification 203 by using data from recent PLC running information 182, asset repository 172 and data storage 162. The change over notification 203 involves the time when the change over occurred, one or more of the asset repository 172 related information such as production model shown in 301, production line shown in 302, and PLCs shown in 310-312.

The flow is invoked at 600. At 601, the flow retrieves a PLC series as shown at 310-312 related to the current production ID shown in 301 from the asset repository 172. At 602, the flow retrieves PLC running information as illustrated at 511-516 and as related to the PLC series retrieved at 601 from the recent PLC running information 182. At 603, a determination is made as to whether the PLC series stopped within a certain short term (e.g. 2 min), then restarted within a certain short term (e.g. 2 min). If not (N) then the flow proceeds back to 601. Otherwise (Y) the flow proceeds to 604 as a potential change over may have occurred.

At 604, the flow retrieves all values 404 on all metrics 403 on all PLC series retrieved at 601 within a certain term (e.g. 30 min) before the stoppage evaluated on 603 (hereinafter, previous-values) and within a certain term (e.g. 30 min) after the restart evaluated on 603 (hereinafter, after-values) from data storage 162.

At 605, the flow extracts various types of features (e.g. average, median, variance, deviation, etc.) from the previous-values and after-values retrieved at 604.

At 606, the flow calculates the differentiation (difference) score between the features from previous-values and after-values by using the formula that indicates the higher score as the differentiation of each feature, wherein the features having high differentiation appears consecutively such as Π[all features] (f(differentiation of feature, number of consecutive high differentiation)), or other formulas that fit the desired implementation. As for another formula calculation candidate, the formula calculates the child scores by using features from each of the PLCs by considering a number of features that have a high differentiation (e.g., beyond a threshold), and then calculates final score based on child scores. Through this example implementation, the formula considers situations involving a partial change over that affects a few PLCs.

Figure 6B:
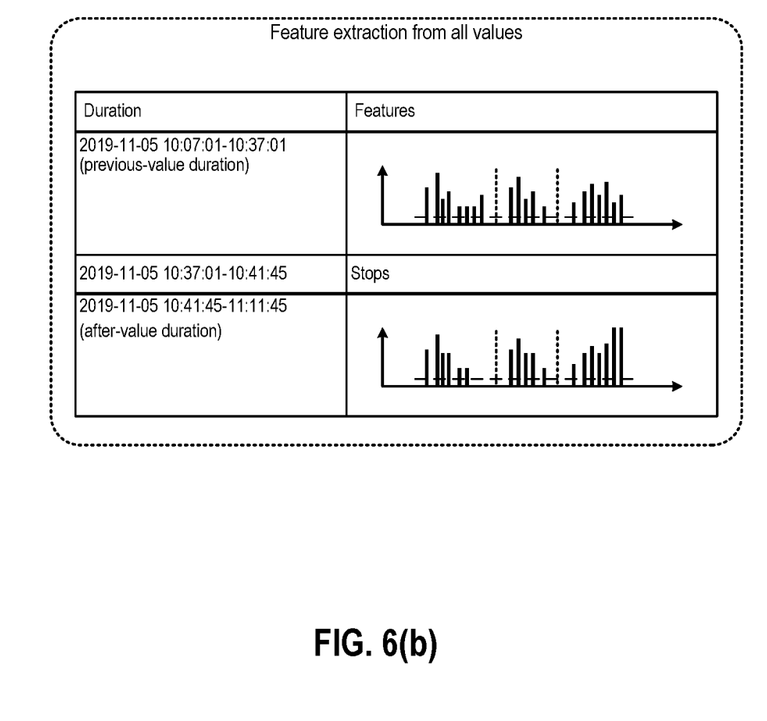

At 607, a determination is made as to whether the calculated score at 606 is greater than a threshold. If not (N), the flow proceeds to 601. Otherwise (Y), a determination is made that a change over event has occurred, and the flow proceeds to 608 to send the change over notification 203 to asset manager 171 and learning change over 183. FIG. 6(b) illustrates an example of a feature extraction for all values in accordance with an example implementation. The graph of features indicates each of the feature values collected from PLCs wherein the areas between vertical dotted lines indicate the feature series from one PLC. Some of the feature values in after-value duration are clearly different from previous-values before the stop duration. Such feature extraction is conducted through the flow of FIG. 6(a).

Figure 7:
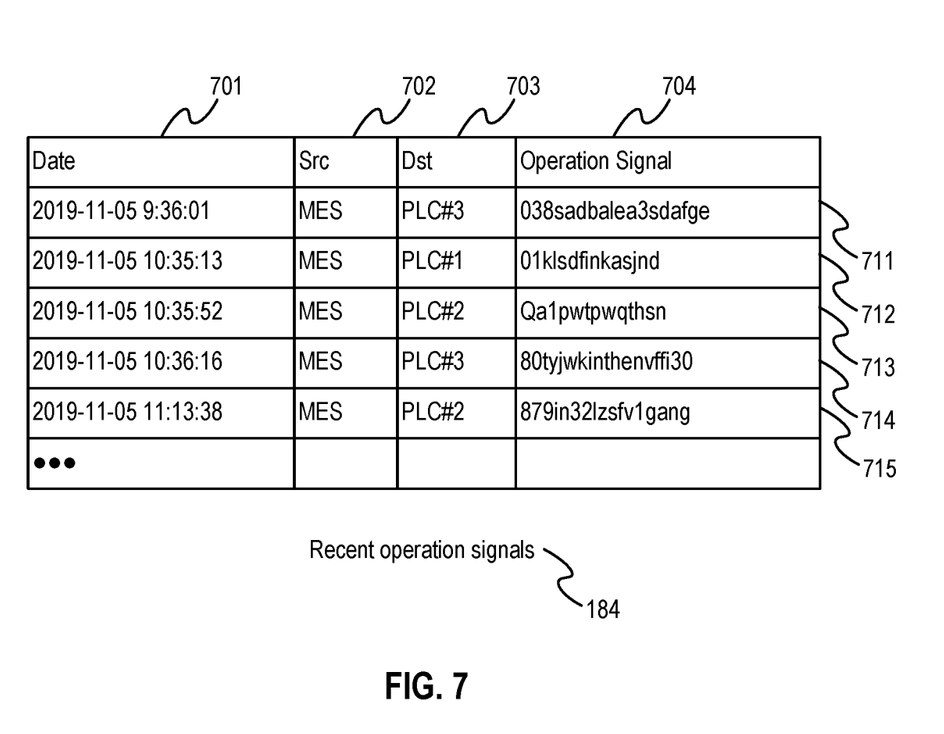
FIG. 7 illustrates an example of the recent operation signals in accordance with an example implementation.

FIG. 7 illustrates an example of the recent operation signals 184 in accordance with an example implementation. The recent operation signals 184 stores the monitored signal between MES 130 and PLCs 140-142 in a time series manner within a certain duration (e.g. 1 day). As illustrated in FIG. 7, the recent operation signals 184 can include the date 701, the source of the operation signal 702, the destination for the operation signal 703, and the operation signal 704.

Recent operation signals 184 can involve entries 711, 712, 713, 714, 715. For example, entry 711 indicates that at date "2019-11-05 9:36:01", MES transmitted operation signal "038sadbalea3sdafge" to PLC#3.

Figure 8A:
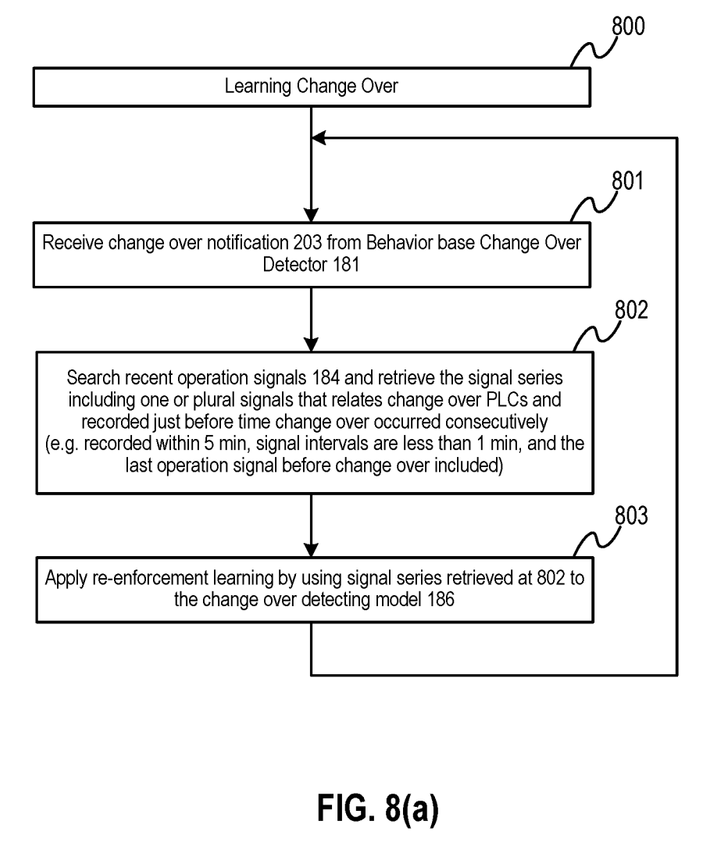

FIG. 8(a) illustrates a flowchart of an example of the learning change over 183, in accordance with an example implementation. The learning change over 183 receives the change over notification 203 from the behavior base change over detector 181, corresponds the change over notification 203 with the search signal series from the recent operation signals 184, and applies re-enforcement learning to the change over detecting model 185. The change over detecting model 185 accepts one or plural sequential inputs and output one score representing change over possibility. For example, recurrent neural network (hereinafter, RNN) type logic or other types of learning can be used in accordance with the desired implementation. An example implementation of RNN can involve receiving a plurality of consecutive input 712, 713 and 714, and then providing an output of the score 0 from 1 that indicates the possibility of change over.

The flow is invoked at 800. At 801, the flow receives a change over notification 203 from behavior base change over detector 181. At 802, the flow searches recent operation signals 184 and retrieves the signal series including one or more signals that relates the change over PLCs and recorded just before the time the change over occurred consecutively (e.g. recorded within 5 min, signal intervals are less than 1 min, and the last operation signal before change over is included). At 803, the flow applies re-enforcement learning by using signal series retrieved at 802 to the change over detecting model 185.

Figure 8B:
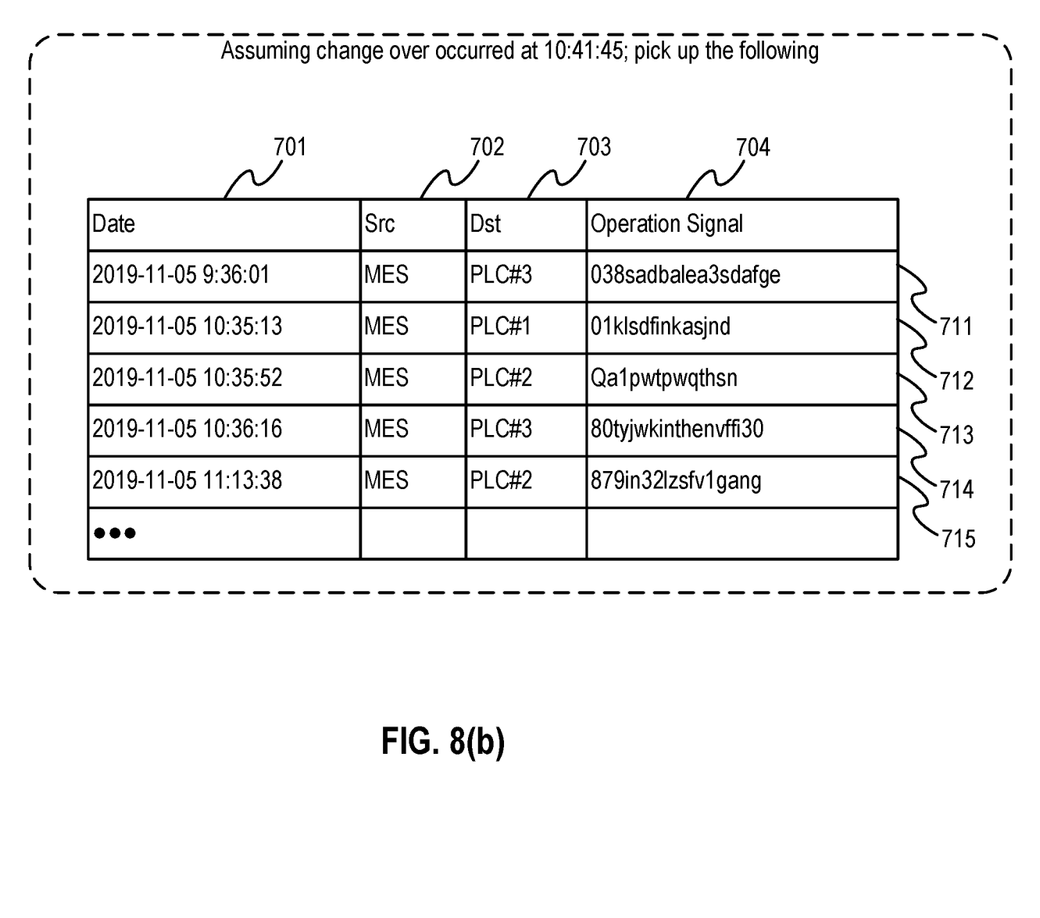

FIG. 8(b) illustrates an example of extraction of data from the flow of FIG. 8(a) at 802. In the example of FIG. 8(b), the change over occurred at 10:41:45 so the signal series as illustrated in FIG. 8(b) is obtained based on the operation data timestamp. An example of re-enforcement learning uses the signal series that involves Src 702, Dst 703 and Operation Signal 704 and the results that indicates a change over has been occurred or not, then enhance the learning model.

Figure 9:
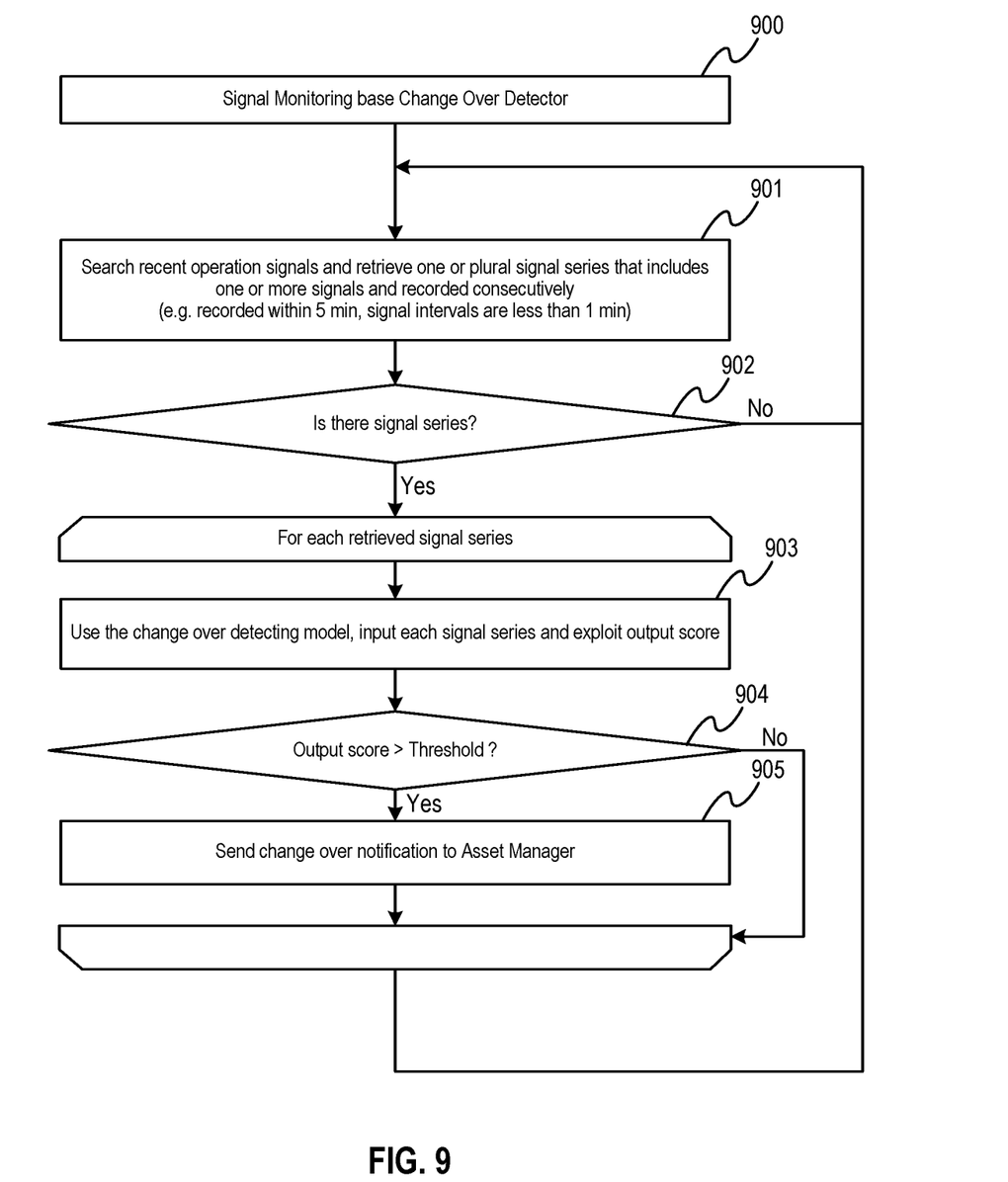
FIG. 9 illustrates a flowchart of an example of the signal monitoring base change over detector, in accordance with an example implementation.

FIG. 9 illustrates a flowchart of an example of the signal monitoring base change over detector 186, in accordance with an example implementation. The signal monitoring base change over detector 186 scrapes the recent operations signals 184 intermittently (e.g. every 30 min interval), collects one or more signal series, and evaluates the score by using the change over detecting model 185 and send change over notification 203 to the asset manager 171 if the score over threshold.

The flow is invoked at 900. At 901, the flow searches the recent operation signals 184 and retrieves one or more signal series that includes one or more signals recorded consecutively (e.g. recorded within 5 min, signal intervals are less than 1 min). At 902, a determination is made as to whether a signal series is present. If so (Y) then the flow proceeds to 903, otherwise (N) the flow reverts back to 901.

At 903-905, an iterative process is initiated to process each of the signal series retrieved at 901. At 903, the change over detecting model 185 is used wherein each signal series is input to determine an output model score. At 904, a determination is made as to whether the output model score from 903 exceeds a threshold. If not (N), then the iteration proceeds to the next signal series, otherwise (Y) the flow proceeds to 905 to send the change over notification 203 to the asset manager 171.

Figure 10:
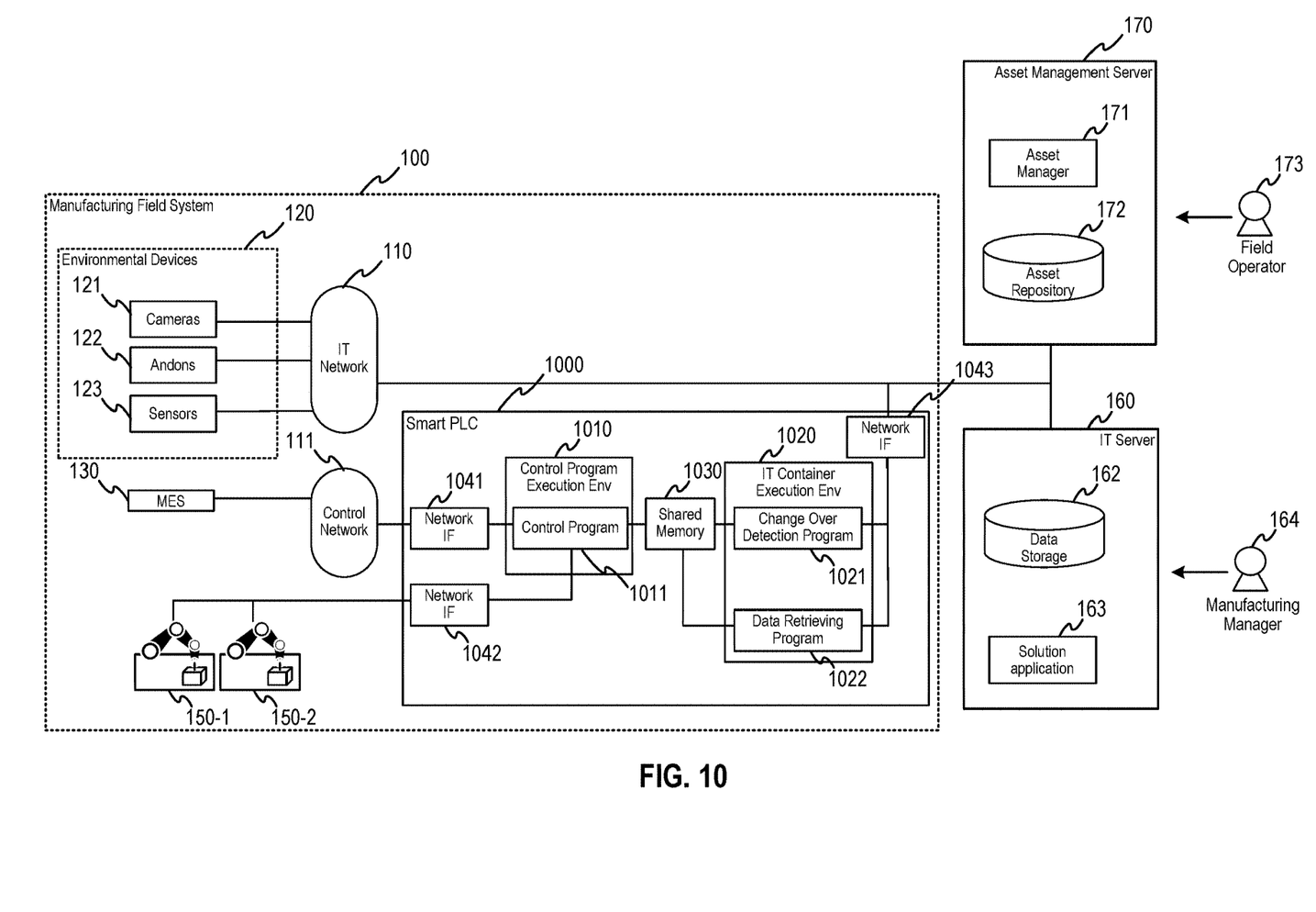
FIG. 10 illustrates a system diagram of an example change over detection system in accordance with another example implementation.

FIG. 10 illustrates a system diagram of an example change over detection system in accordance with another example implementation. In the example system, there are one or more smart PLCs 1000. The smart PLC 1000 involves a control program execution environment 1010, IT container execution environment 1020, a shared memory 1030 and multiple network interfaces (IF) 1041, 1042, 1043.

The control program execution environment 1010 can include control program 1011. The control program 1011 drives at least one asset 150-1, 150-2, receive operation signals from MES 130 via the control network 111 and shares data regarding asset control status and operation signals from MES 130 via the shared memory 1030.

The IT container execution environment 1020 involves a change over detection program 1021 and data retrieving program 1022. The change over detection program 1021 involves the same function as the change over detection server 180 on FIG. 1. The change over detection program 1021 retrieves operation signal from MES 130 and PLC running information via shared memory 1030 from control program 1011. The data retrieving program 1022 retrieves PLC control data from the control program 1011 via the shared memory 1030 as well as the data retriever 161 on FIG. 1.

Figure 11:
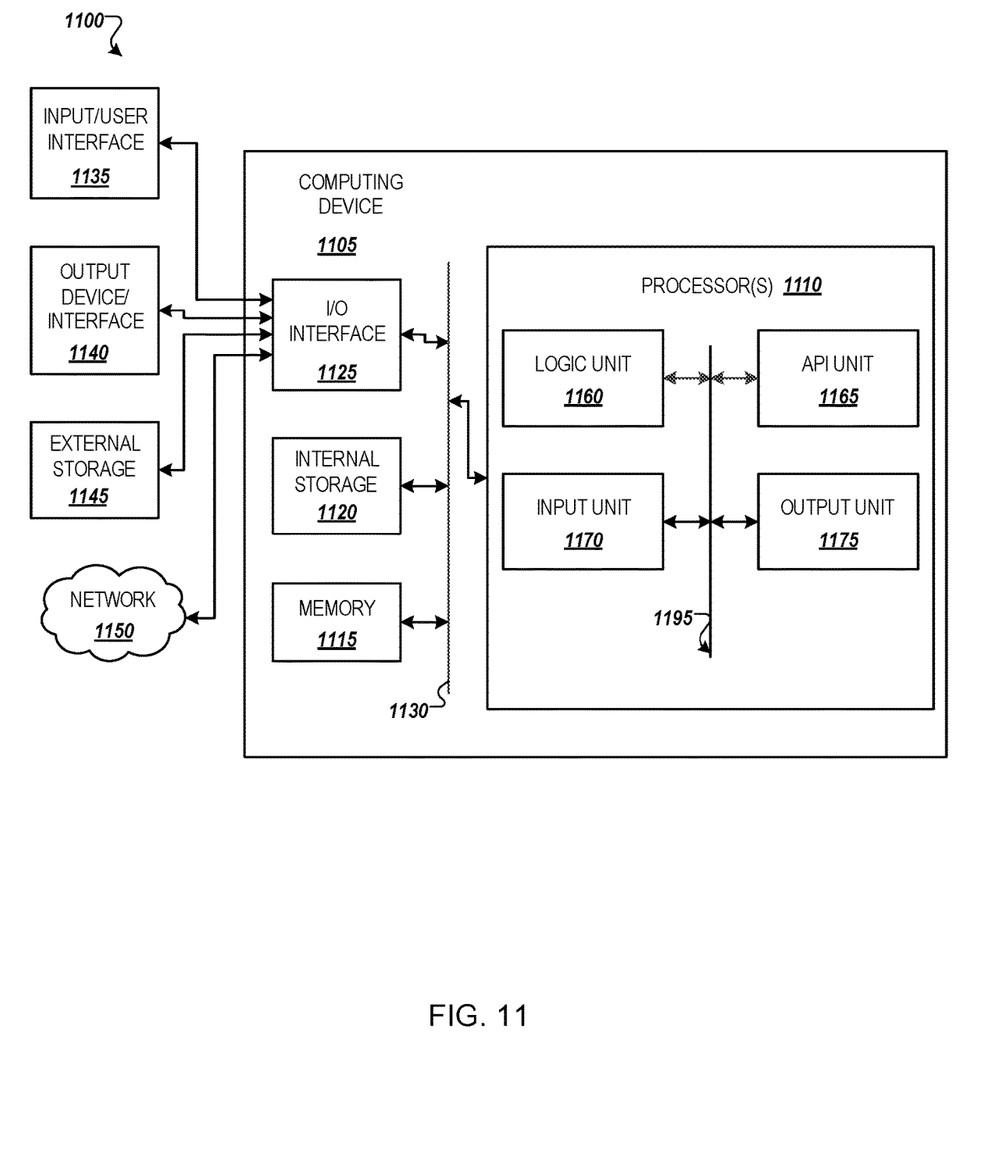
FIG. 11 illustrates an example computing environment with an example computer device suitable for use in some example implementations.

FIG. 11 illustrates an example computing environment with an example computer device suitable for use in some example implementations, such as a change over detection server coupled to a network connected to environmental devices and another network connected to the PLC and a MES as illustrated in FIG. 1, or a smart PLC configured to manage the PLC as illustrated in FIG. 10.

Computer device 1105 in computing environment 1100 can include one or more processing units, cores, or processors 1110, memory 1115 (e.g., RAM, ROM, and/or the like), internal storage 1120 (e.g., magnetic, optical, solid state storage, and/or organic), and/or IO interface 1125, any of which can be coupled on a communication mechanism or bus 1130 for communicating information or embedded in the computer device 1105. IO interface 1125 is also configured to receive images from cameras or provide images to projectors or displays, depending on the desired implementation.

Computing device 1105 can be communicatively coupled to input/user interface 1135 and output device/interface 1140. Either one or both of input/user interface 1135 and output device/interface 1140 can be a wired or wireless interface and can be detachable. Input/user interface 1135 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1140 may include a display, television, monitor, printer, speaker, braille, or the like. In some example implementations, input/user interface 1135 and output device/interface 1140 can be embedded with or physically coupled to the computing device 1105. In other example implementations, other computing devices may function as or provide the functions of input/user interface 1135 and output device/interface 1140 for a computing device 1105.

Examples of computer device 1105 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1105 can be communicatively coupled (e.g., via IO interface 1125) to external storage 1145 and network 1150 for communicating with any number of networked components, devices, and systems, including one or more computer devices of the same or different configuration. Computer device 1105 or any connected computer device can be functioning as, providing services of, or referred to as a server, client, thin server, general machine, special-purpose machine, or another label.

IO interface 1125 can include, but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 1100. Network 1150 can be any network or combination of networks (e.g., the Internet, local area network, wide area network, a telephonic network, a cellular network, satellite network, and the like).

Computer device 1105 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1105 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1110 can execute under any operating system (OS) (not shown), in a native or virtual environment. One or more applications can be deployed that include logic unit 1160, application programming interface (API) unit 1165, input unit 1170, output unit 1175, and inter-unit communication mechanism 1195 for the different units to communicate with each other, with the OS, and with other applications (not shown). The described units and elements can be varied in design, function, configuration, or implementation and are not limited to the descriptions provided. Processor(s) 1110 can be in the form of hardware processors such as central processing units (CPUs) or in a combination of hardware and software units.

In some example implementations, when information or an execution instruction is received by API unit 1165, it may be communicated to one or more other units (e.g., logic unit 1160, input unit 1170, output unit 1175). In some instances, logic unit 1160 may be configured to control the information flow among the units and direct the services provided by API unit 1165, input unit 1170, output unit 1175, in some example implementations described above. For example, the flow of one or more processes or implementations may be controlled by logic unit 1160 alone or in conjunction with API unit 1165. The input unit 1170 may be configured to obtain input for the calculations described in the example implementations, and the output unit 1175 may be configured to provide output based on the calculations described in example implementations.

Processor(s) 1110 can be configured to, for a detection of a stoppage and a restart of the PLC within a threshold period of time, retrieve first metrics from the PLC from before the stoppage and second metrics from the PLC from after the restart; extract first features from the first metrics and second features from the second metrics; and for a difference between the first features and the second features exceeding a threshold, transmit a notification to an asset management server indicative of a changeover of an asset of the PLC as illustrated in FIG. 6(a).

As illustrated in FIG. 6(b), the first features can involve a plurality of different types of features, wherein the second features involves the plurality of different types of features, wherein the difference is determined based on differences across the plurality of different types of features between the first features and the second features over a period of time. Depending on the desired implementation, the difference can also be determined based on a number of differences across the plurality of different types of features between the first features and the second features that exceed a predetermined threshold for each managed PLC as illustrated in FIGS. 6(a) and 6(b).

As illustrated in FIG. 9 through the data indicated in FIG. 7, processor(s) 1110 can be configured to retrieve, from operation signals of the PLC, series data corresponding to the PLC; and for a score of a changeover detection model executed on the series data of the PLC exceeding another threshold, transmitting the notification to an asset management server indicative of a changeover of an asset of the PLC.

As illustrated in FIG. 8(a), processor(s) 1110 can be configured to apply reinforcement learning on the changeover detection model based on a portion of the series data corresponding to the PLC before the notification indicative of changeover of the asset, with indications regarding whether a change over has occurred or not.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for detecting a changeover of an asset in a manufacturing field, executed by a process, comprising:
   for a detection of a stoppage and a restart of the programmable logic controller (PLC) within a threshold period of time:
      retrieving first metrics from the PLC from before the stoppage and second metrics from the PLC from after the restart;
      extracting first features from the first metrics and second features from the second metrics; and
      for a difference between the first features and the second features exceeding a threshold, transmitting a notification to an asset management server indicative of the changeover of the asset of the PLC;
   retrieving, from operating signals of the PLC, series data corresponding to the PLC;
   for a score of a changeover detection model executed on the series data of the PLC exceeding a threshold, transmitting the notification to an asset management server indicative of the changeover of the asset of the PLC; and
   applying reinforcement learning on the changeover detection model based on a portion of the series data corresponding to the PLC before the notification indicative of the changeover of the asset, with indications regarding whether the changeover has occurred or not.

2. The method of claim 1, wherein the first features comprises a plurality of types of features, wherein the second features comprises the plurality of types of features, wherein the difference is determined based on differences across the plurality of types of features between the first features and the second features over a period of time.

3. The method of claim 1, wherein the first features comprises a plurality of types of features, wherein the second features comprises the plurality of types of features, wherein the difference is determined based on a number of differences across the plurality types of features between the first features and the second features that exceed a predetermined threshold for each managed PLC.

4. The method of claim 1, wherein the method is executed by a server communicatively coupled to a first network connected to environmental devices and a second network connected to the PLC and a Manufacturing Execution System (MES).

5. The method of claim 1, wherein the method is executed by a smart PLC configured to manage the PLC.

6. A non-transitory computer readable medium, storing instructions for executing a process for detecting a changeover of an asset in a manufacturing field, the instructions comprising:

for a detection of a stoppage and a restart of the programmable logic controller (PLC) within a threshold period of time:
retrieving first metrics from the PLC from before the stoppage and second metrics from the PLC from after the restart;
extracting first features from the first metrics and second features from the second metrics; and
for a difference between the first features and the second features exceeding a threshold, transmitting a notification to an asset management server indicative of the changeover of the asset of the PLC;
retrieving, from operation signals of the PLC, series data corresponding to the PLC;
for a score of a changeover detection model executed on the series data of the PLC exceeding a threshold, transmitting the notification to an asset management server indicative of the changeover of the asset of the PLC; and
applying reinforcement learning on the changeover detection model based on a portion of the series data corresponding to the PLC before the notification indicative of the changeover of the asset, with indications regarding whether the changeover has occurred or not.

7. The non-transitory computer readable medium of claim 6, wherein the first features comprises a plurality of types of features, wherein the second features comprises the plurality of types of features, wherein the difference is determined based on differences across the plurality of types of features between the first features and the second features over a period of time.

8. The non-transitory computer readable medium of claim 6, wherein the first features comprises a plurality of types of features, wherein the second features comprises the plurality of types of features, wherein the difference is determined based on a number of differences across the plurality of types of features between the first features and the second features that exceed a predetermined threshold for each managed PLC.

9. The non-transitory computer readable medium of claim 6, wherein the instructions are executed by a server communicatively coupled to a first network connected to environmental devices and a second network connected to the PLC and a Manufacturing Execution System (MES).

10. The non-transitory computer readable medium of claim 6, wherein the instructions are executed by a smart PLC configured to manage the PLC.

11. An apparatus for detecting a changeover of an asset in a manufacturing field, comprising:

a processor, configured to, for a detection of a stoppage and a restart of the programmable logic controller (PLC) within a threshold period of time:
retrieve first metrics from the PLC from before the stoppage and second metrics from the PLC from after the restart;
extract first features from the first metrics and second features from the second metrics; and
for a difference between the first features and the second features exceeding a threshold, transmit a notification to an asset management server indicative of the changeover of the asset of the PLC;
retrieve from operation signals of the PLC, series data corresponding to the PLC,
for a score of a changeover detection model executed on the series data of the PLC exceeding a threshold, transmit the notification to an asset management server indicative of the changeover of the asset of the PLC; and
apply reinforcement learning on the changeover detection model based on a portion of the series data corresponding to the PLC before the notification indicative of the changeover of the asset, with indications regarding whether the changeover has occurred or not.

\* \* \* \* \*